US008752601B2

(12) United States Patent
Takahashi et al.

(10) Patent No.: US 8,752,601 B2
(45) Date of Patent: Jun. 17, 2014

(54) PNEUMATIC TIRE WITH SPECIFIED CARCASS CURVATURE

(75) Inventors: Fumio Takahashi, Kodaira (JP); Souto Nakayama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/259,891

(22) PCT Filed: Apr. 14, 2010

(86) PCT No.: PCT/JP2010/002720
§ 371 (c)(1),
(2), (4) Date: Sep. 23, 2011

(87) PCT Pub. No.: WO2010/119681
PCT Pub. Date: Oct. 21, 2010

(65) Prior Publication Data
US 2012/0018071 A1    Jan. 26, 2012

(30) Foreign Application Priority Data

Apr. 16, 2009   (JP) ................................ 2009-100283

(51) Int. Cl.
*B60C 3/04*    (2006.01)
*B60C 3/00*    (2006.01)
*B60C 9/02*    (2006.01)
*B60C 9/28*    (2006.01)
*B60C 15/00*   (2006.01)

(52) U.S. Cl.
CPC ... *B60C 3/04* (2013.01); *B60C 3/00* (2013.01); *B60C 9/0292* (2013.04); *B60C 9/28* (2013.01); *B60C 15/0009* (2013.04); *B60C 2009/286* (2013.04)
USPC ............ 152/454; 152/538; 152/548; 152/554

(58) Field of Classification Search
USPC ................................... 152/454, 554, 538, 548
See application file for complete search history.

(56) References Cited

U.S. PATENT DOCUMENTS 4,630,663 A * 12/1986 Bell et al. .................. 152/554 X
4,762,158 A    8/1988 Furuya et al.
5,117,886 A    6/1992 Tokutake
6,491,077 B1 12/2002 Lopez et al.
6,640,860 B1 11/2003 Metge et al.

FOREIGN PATENT DOCUMENTS

GB    2 006 695 A    5/1979
JP    61-211104 A    9/1986
JP    63-269702 A    11/1988

(Continued)

OTHER PUBLICATIONS

English machine translation of JP 2004-98838, Apr. 2, 2004.*

(Continued)

*Primary Examiner* — Adrienne C Johnstone
(74) *Attorney, Agent, or Firm* — Sughrue Mion, PLLC

(57) ABSTRACT

In a cross section in a tire width direction when a tire is mounted on a prescribed rim (7), a belt has a flat shape in the tire width direction, the height (SWh) of the position where the tire width is the maximum is more than half the cross-sectional height (SH) of the tire, and a path length ($CSR_1$) of the carcass from an intersection ($I_1$) to an intersection ($I_2$), is longer than a path length ($CSR_2$) of the carcass from the intersection ($I_1$) to an intersection ($I_3$).

3 Claims, 6 Drawing Sheets

(56) References Cited

FOREIGN PATENT DOCUMENTS

| | | |
|---|---|---|
| JP | 6-156011 A | 6/1994 |
| JP | 2002-514539 A | 5/2002 |
| JP | 2004-098838 A | 4/2004 |
| JP | 2006-327502 A | 12/2006 |
| JP | 2009-279948 A | 12/2009 |
| WO | 2009/078425 A1 | 6/2009 |

OTHER PUBLICATIONS

English machine translation of JP 2006-327502 A, Dec. 7, 2006.*
English machine translation of JP 2009-279948 A, Dec. 3, 2009.*
International Search Report issued in International Application No. PCT/JP2010/002720 dated Jun. 29, 2010.
Japanese Office Action issued in Japanese Application No. 2009-100283 dated Mar. 12, 2013.
Chinese Office Action issued in Chinese Application No. 201080017125.5 dated May 20, 2013.
Extended European Search Report issued in European Application No. 10764268.8 dated Jun. 18, 2013.
Chinese Office Action, dated Oct. 25, 2013, issued in corresponding Chinese Patent Application No. 201080017125.5.
Chinese Office Action, dated Mar. 13, 2014, issued in Chinese Patent Application No. 201080017125.5.

* cited by examiner

PNEUMATIC TIRE WITH SPECIFIED CARCASS CURVATURE

TECHNICAL FIELD

The present invention relates to a pneumatic tire having a low rolling resistance.

RELATED ART

Recently, there is a growing demand for energy saving due to concerns over global environmental problems. In particular, studies on reduction in fuel consumption of automobiles have been actively made. One of the means for reducing fuel consumption of automobiles is reduction in the rolling resistance of a tire, which is a major energy loss while moving. Some conventional improvement methods for reducing the rolling resistance are shown below.

It is known that an energy loss generated in the rubber of the tread portion is a dominant cause for the rolling resistance of a tire. As a direct improvement method, change of the rubber used for the tread portion to one having a low loss tangent is effective. However, it is also known that, with this method, other performances of the tire including wear resistance, for example, may suffer.

On the other hand, in order to reduce the amount of rubber, which is a source for generating an energy loss that increases the rolling resistance, a method for reducing the thickness of the tread may easily be conceived of. However, with this method, the wear life of the tire cannot be ensured. Further, Patent Document 1 proposes to design a special shaped cross-section of a tire to reduce the rolling resistance. This proposal assures that the rolling resistance can be reduced, however, when considering other performances such as a particularly high wear resistance, a more detailed design is required.

RELATED PATENT DOCUMENTS

Patent Document 1: Japanese Patent Application Laid-open No. 2006-327502

DISCLOSURE OF THE INVENTION

Problems to be Solved by the Invention

An object of the present invention is to propose details of a tire shape to provide a tire having a low rolling resistance.

Means for Solving the Problems

In order to reduce energy loss, which is a main cause for the rolling resistance of a tire, inventors of the present invention made an extensive review and recognized that it is effective to design a tire shape so that deformation of a tread portion before and after loading will be as small as possible, and thus brought the present invention to completion.

The structural features of the present invention are shown below.

(1) A pneumatic tire comprises a pair of bead portions, a carcass as a skeleton extending in a toroidal shape across the pair of bead portions, a belt including at least one slant belt layer, and a tread, the belt and the tread being sequentially disposed on a radially outer side of a crown portion of the carcass, wherein as seen in a cross section in the tire width direction when the tire is mounted on a prescribed rim,

[1] the belt has a flat shape in the tire width direction;

[2] an SWh/SH ratio is not less than 0.5, where SWh is the shortest distance between a line segment drawn parallel to a rotation axis of the tire at a maximum width position of the tire and a line segment drawn parallel to the rotation axis of the tire at a bead toe, and SH is a sectional height of the tire;

[3] a curvature of the carcass in the cross section in the tire width direction is the maximum on a path from an intersection ($I_2$) between a line segment drawn perpendicular to the rotation axis of the tire from a widthwise end of the narrowest slant belt layer and the carcass, to an intersection ($I_4$) between a line segment drawn parallel to the rotation axis of the tire at the maximum width position of the tire and the carcass; and

[4] a path length $CSR_1$ of the carcass from an intersection ($I_1$) between a line bisecting a radial distance CSH between the radially outermost end of the carcass and the radially outermost end of a bead core and extending parallel to the rotation axis of the tire, to the intersection ($I_2$), is longer than a path length $CSR_2$ of the carcass from the intersection ($I_1$) to an intersection ($I_3$) between a line segment connecting the radially outermost ends of both bead cores and the carcass.

In this instance, the belt "has a flat shape" in the tire width direction means that, in a cross section in the width direction, the belt has a shape which is generally parallel to the rotation axis of the tire. More specifically, it means that a BD/BW ratio of a radial difference BD between the widthwise center and the widthwise end of the slant belt layer to the width BW of the narrowest slant belt layer of the slant belt layers constituting the belt, is in a range from not less than 0.01 to not more than 0.07. More preferably, the BD/BW ratio is in a range from not less than 0.01 to not more than 0.04. The state in which the tire is mounted on a prescribed rim means that the tire is mounted on a standard rim as provided in the standard of Japan Automobile Tyre Manufacturers Association (JATMA) or on other applicable rims and an internal pressure is not applied or an extremely-low internal pressure up to about 30 kPa is applied.

(2) The pneumatic tire according to (1) is characterized in that the carcass has a turn-up portion turning up around the bead core from the inner side to the outer side in the tire width direction and extending therefrom, and the shortest distance CSEh between the end of the turn-up portion and the line segment drawn parallel to the rotation axis of the tire at the bead toe is not more than the shortest distance SWh between the line segment drawn parallel to the rotation axis of the tire at the maximum width position of the tire and the line segment drawn parallel to the rotation axis of the tire at the bead toe.

(3) The pneumatic tire according to (2) is characterized in that the shortest distance CSEh between the end of the turn-up portion and the line segment drawn parallel to the rotation axis of the tire at the bead toe is not more than 0.5 times the shortest distance SWh between the line segment drawn parallel to the rotation axis of the tire at the maximum width position of the tire and the line segment drawn parallel to the rotation axis of the tire at the bead toe.

(4) The pneumatic tire according to any one of the above described (1) to (3) is characterized in that a curvature radius at the portion where the curvature of the carcass is the maximum is not more than 25 mm.

Effects of the Invention

According to the present invention, a tire having a low rolling resistance can be provided.

BEST MODE FOR CARRYING OUT THE INVENTION

Figure 1:
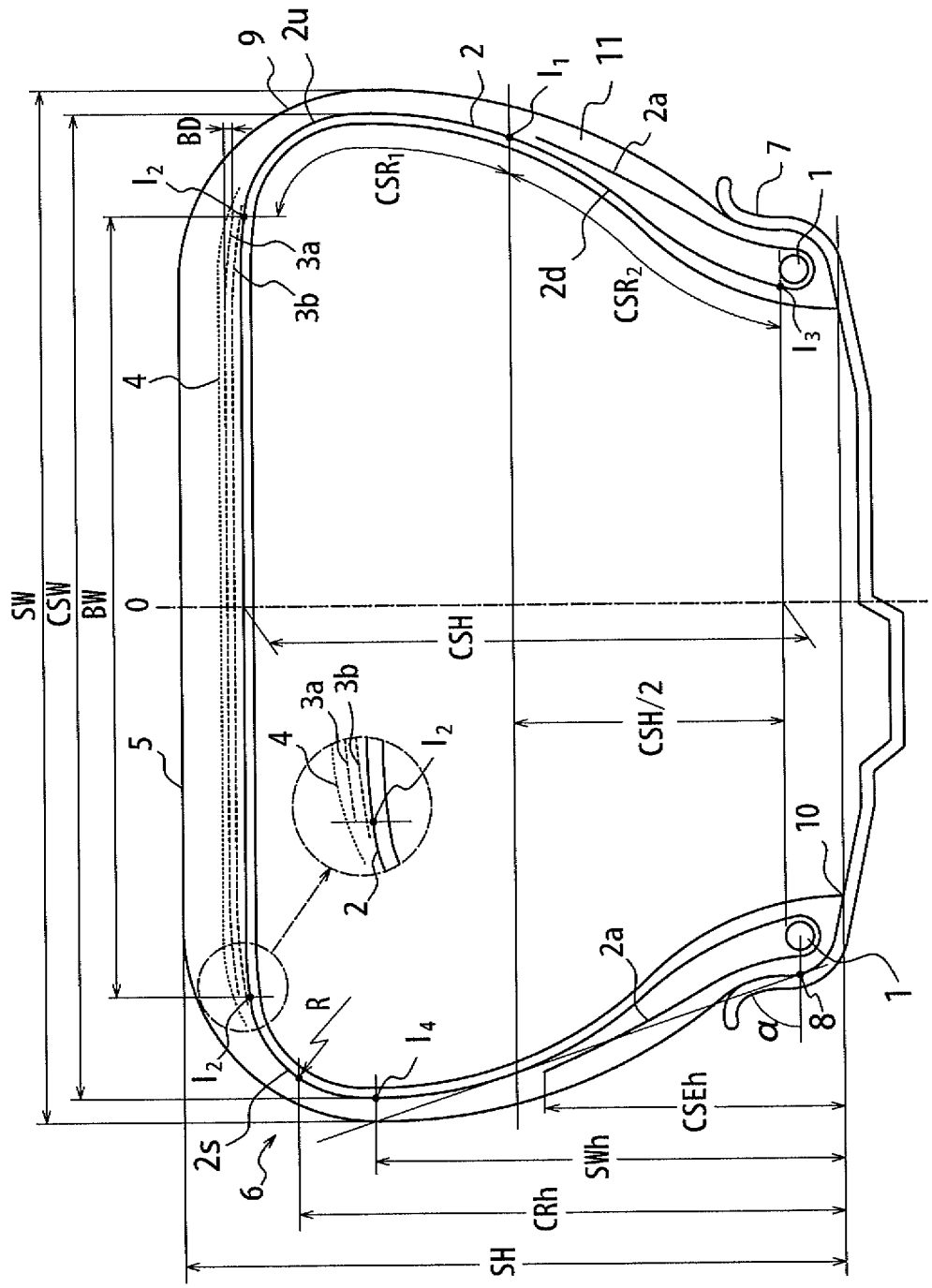
FIG. 1 is a widthwise cross-sectional view of a tire according to the present invention.

The present invention is described in detail below with reference to the drawings. FIG. 1 shows a widthwise cross section of a tire according to the present invention. In the drawing, the reference numeral 1 represents a pair of bead cores. Between the bead cores 1, a carcass 2 which extends in a toroidal shape across the bead cores 1 and is composed of radially disposed plies of cord is provided as a skeleton. On the radially outer side of a crown portion of the carcass 2, at least one layer, which is two layers of slant belt layers 3a and 3b in an example shown in the drawing, is disposed, in which, a multiple number of cords extending in a slanting direction relative to the equatorial plane 0 of the tire is covered by a rubber. On the radially outer side of these belts, at least one layer, which is one layer of circumferential belt layer 4 in the example shown in the drawing, is disposed, in which, a multiple number of cords extending in a slanting direction relative to the equatorial plane 0 of the tire is covered by a rubber, and on the radially outer side of these belts, a tread 5 is disposed. It should be noted that the number of slant belt layers can be one, however, in that case, it is preferable that the belt layer is composed in combination with at least one circumferential belt layer.

Such tire 6 is mounted on an applicable rim 7 and subjected to use. In this instance, in the cross section in the tire width direction when the tire is mounted on the applicable rim 7, as shown in FIG. 1, it is vital that

[1] the belt has a flat shape in the tire width direction;

[2] an SWh/SH ratio is not less than 0.5 where SWh is the ratio of the shortest distance between a line segment drawn parallel to a rotation axis of the tire at a maximum width position of the tire and a line segment drawn parallel to the rotation axis of the tire at a bead toe, and SH is a sectional height of the tire;

[3] a curvature of the carcass in the cross section in the tire width direction is the maximum on a path from an intersection ($I_2$) between a line segment drawn perpendicular to the rotation axis of the tire from a widthwise end of the narrowest slant belt layer and the carcass, to an intersection ($I_4$) between a line segment drawn parallel to the rotation axis of the tire at the maximum width position of the tire and the carcass; and

[4] a path length $CSR_1$ of the carcass from an intersection ($I_1$) between a line bisecting a radial distance CSH between the radially outermost end of the carcass and the radially outermost end of a bead core and extending parallel to the rotation axis of the tire, to the intersection ($I_2$), is longer than a path length $CSR_2$ of the carcass from the intersection ($I_1$) to an intersection ($I_3$) between a line segment connecting the radially outermost ends of both bead cores and the carcass. In this instance, the slant belt layer has a width not less than 0.6 times the maximum width CSW of the carcass.

The above described detailed features from [1] to [4] are for reducing the rolling resistance by controlling the deformation of the portion that produces a lot of energy loss due to deformation and by preferentially deforming the portion that produces less energy loss due to deformation.

In other words, the conventional tires usually have a relatively round cross-sectional shape as represented by a natural equilibrium shape, which makes sense in terms of a pneumatic tire originally designed as a pressure vessel. However, a tread portion and a bead portion are significantly deformed under load, and the deformation causes an energy loss.

Figure 2:
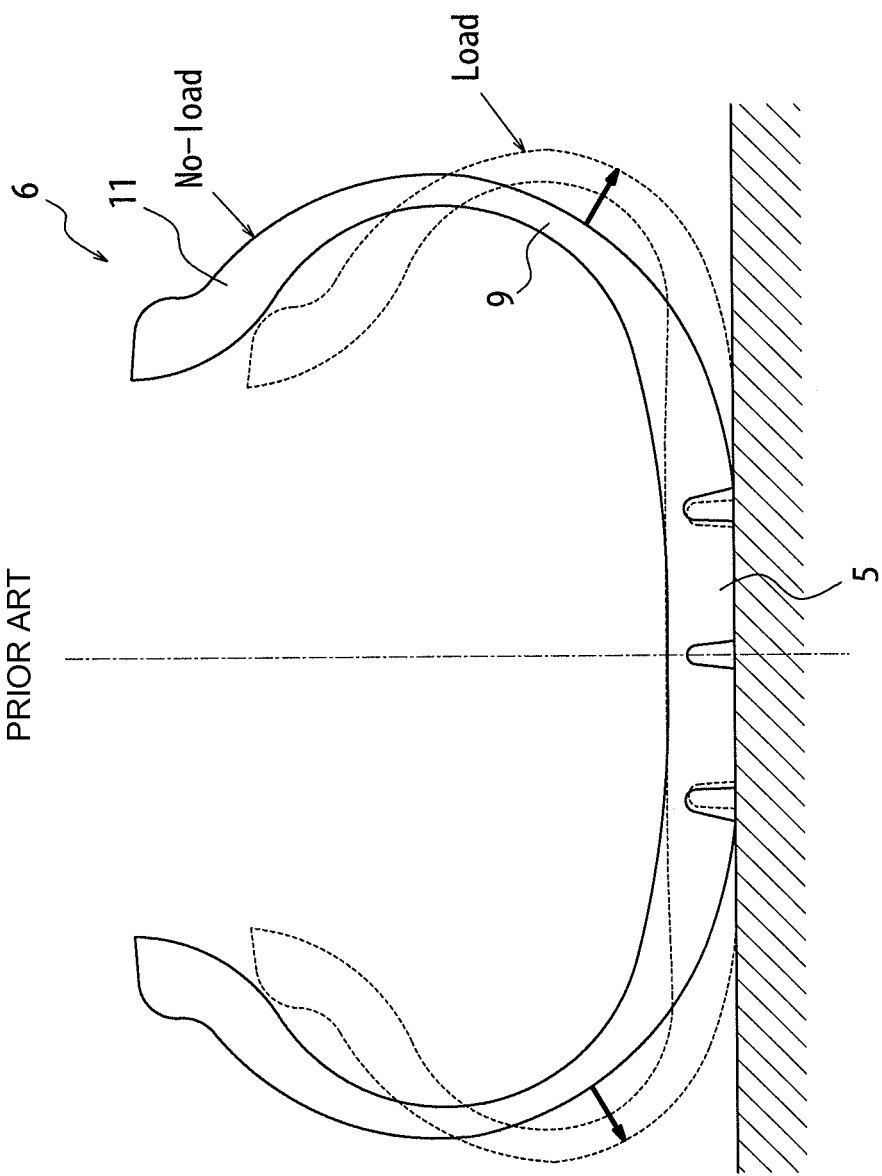
FIG. 2 is a diagram showing a behavior of a conventional tire before and after loading.

FIG. 2 shows a conventional common tire in a no-loading state before inflating by a solid line and in a loading state after inflating by a dotted line. As can be seen from FIG. 2, as for the conventional tire, the shoulder portion 9 of the tire significantly expands obliquely downward under load, and thus the curved tread portion 5 is stretched and contacts the ground. Further, the flex range of the side portion of the tire under load is large, and even a bead portion 11 is deformed.

Figure 3:
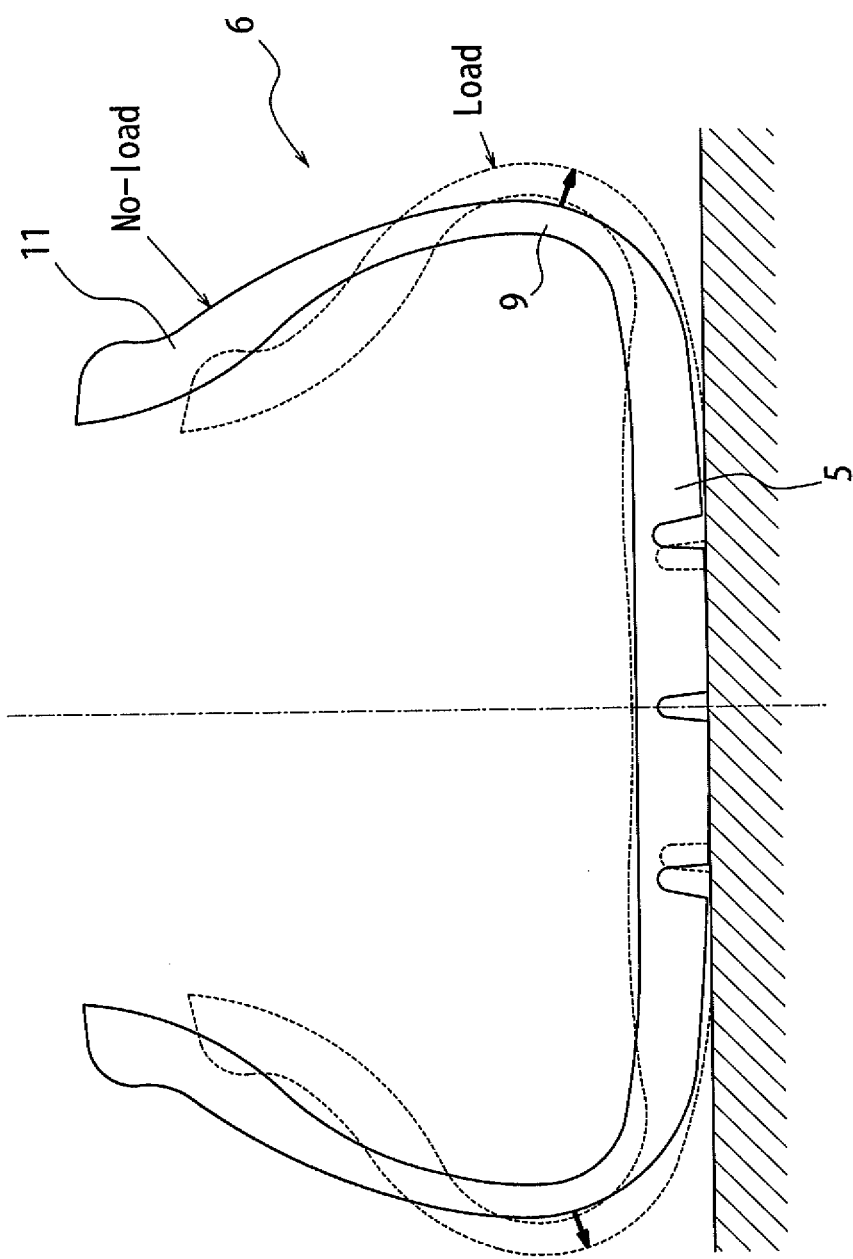
FIG. 3 is a diagram showing a behavior of the tire before and after loading according to the present invention.

On the other hand, as for the tire according to the present invention, deformation amount of the tread portion 5 and the bead portion 11 due to contact with the ground is small. FIG. 3 shows deformation of the tire according to the present invention before and after loading under the same conditions as those of FIG. 2. As can be seen in FIG. 3, as for the tire according to the present invention, although the shoulder portion 9 thereof is flexed significantly under load, no wide expansion in the tire width direction is caused, which shows that there is little change in the shapes of the tread portion 5 and the bead portion 11 before and after loading. In other words, the shoulder portion 9 generating a small energy loss due to deformation is preferentially flexed, thereby mitigating flex of the tread portion 5 and the bead portion 11 generating a lot of energy loss due to deformation, and thus overall energy loss is reduced.

Figure 4:
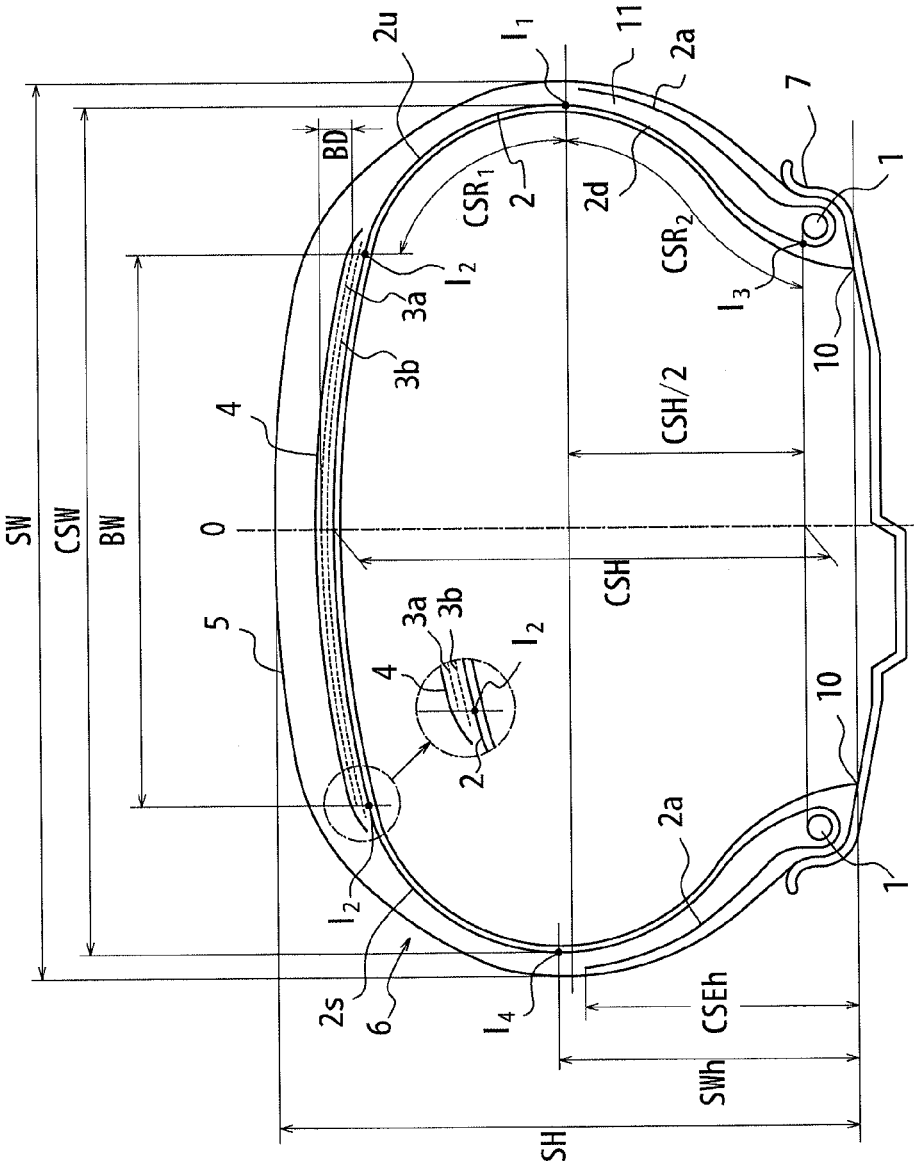
FIG. 4 is a widthwise cross-sectional view of the conventional tire.
Figure 5:
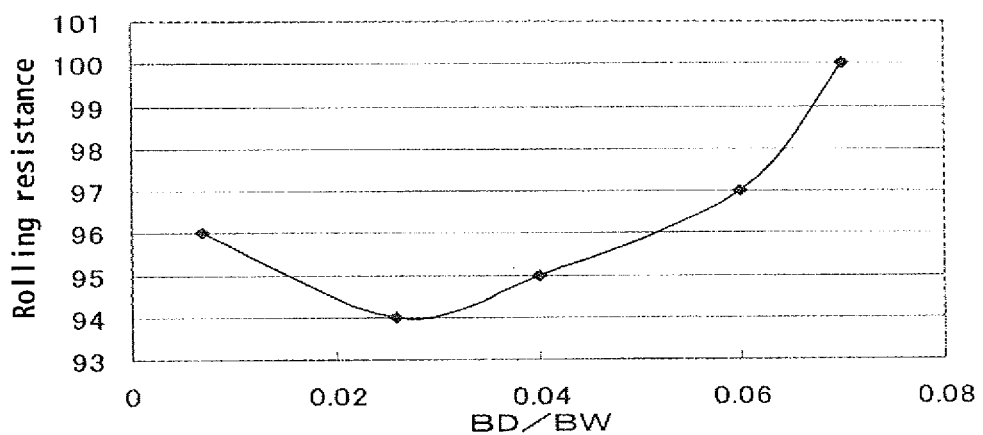
FIG. 5 is a diagram showing an influence of a BD/BW ratio on the rolling resistance.
Figure 6:
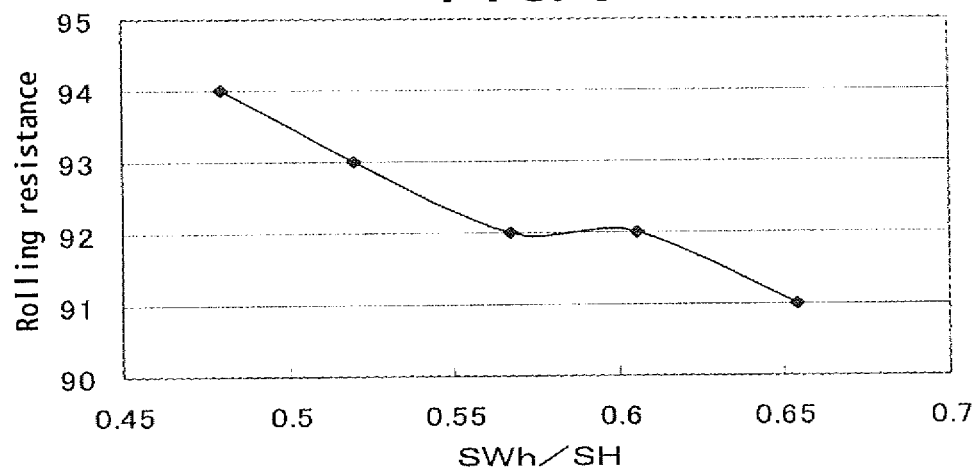
FIG. 6 is a diagram showing an influence of an SWh/SH ratio on the rolling resistance.
Figure 7:
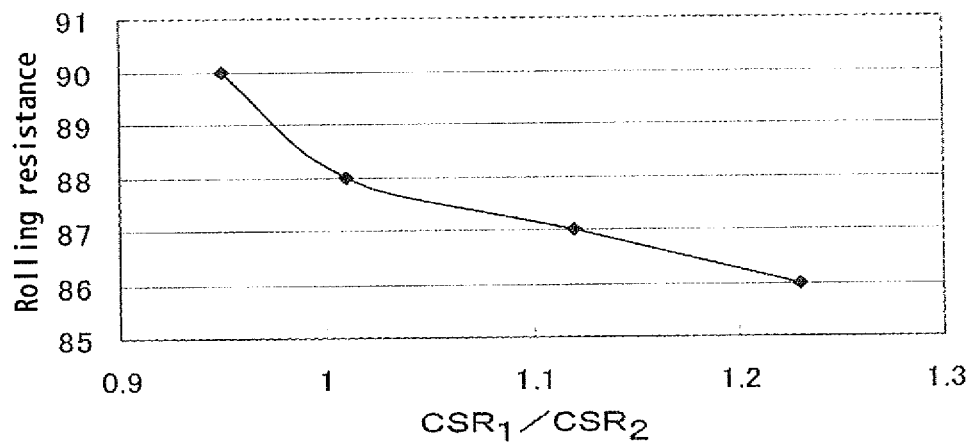
FIG. 7 is a diagram showing an influence of a $CSR_1/CSR_2$ ratio on the rolling resistance.
Figure 8:
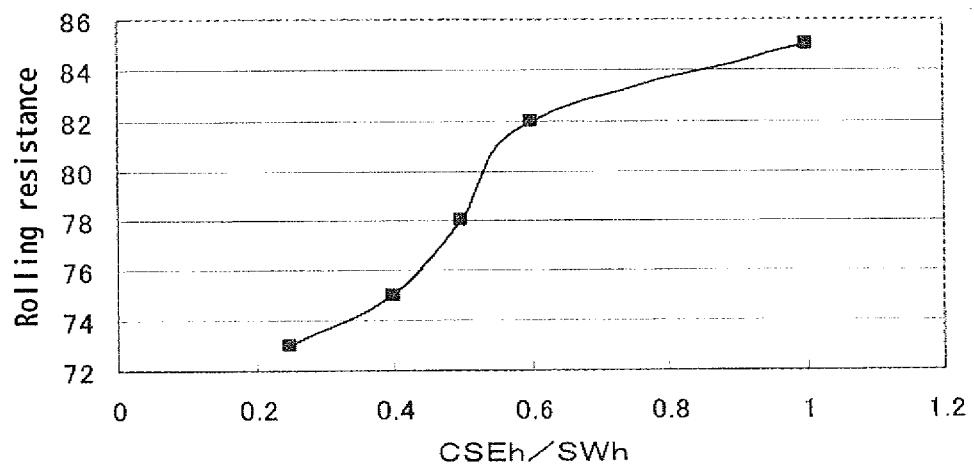
FIG. 8 is a diagram showing an influence of a CSEh/SWh ratio on the rolling resistance.
Figure 9:
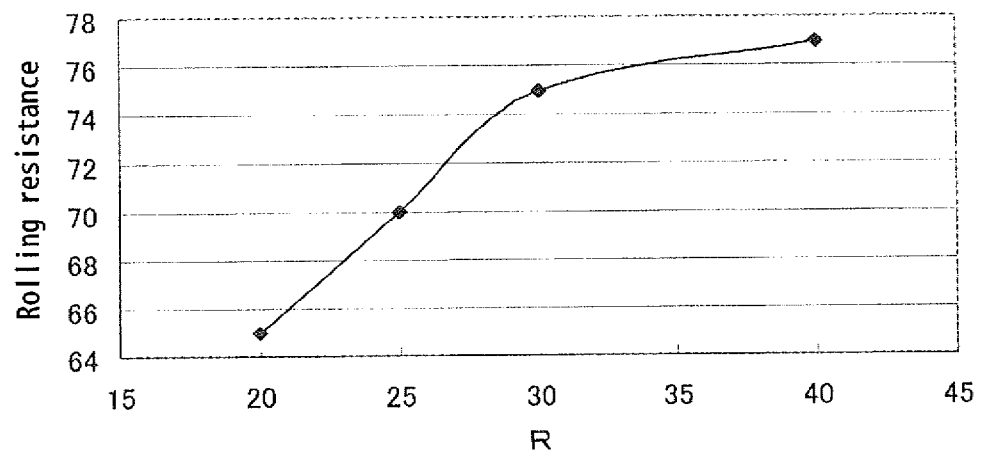
FIG. 9 is a diagram showing an influence of a curvature radius R on the rolling resistance.

Each of the features [1] to [4] satisfied by the tire according to the present invention is described in detail below. FIG. 4 is a widthwise cross-sectional view of the conventional tire, FIG. 5 is a diagram showing an influence of a BD/BW ratio on the rolling resistance, FIG. 6 is a diagram showing an influence of an SWh/SH ratio on the rolling resistance, FIG. 7 is a diagram showing an influence of a $CSR_1/CSR_2$ ratio on the rolling resistance, FIG. 8 is a diagram showing an influence of a CSEh/SWh ratio on the rolling resistance, and FIG. 9 is a diagram showing an influence of a curvature radius R on the rolling resistance.

First, the feature [1] defines that the belt has a flat shape in the tire width direction, which means that, with respect to the slant belt layer 3, the radial difference in the width direction is small, and, more specifically, a BD/BW ratio, which is a ratio of radial difference BD between the widthwise center and the widthwise end of the slant belt layer 3a to the width BW of the slant belt layer 3a having a narrowest width among the slant belt layers 3 constituting the belt, is in a range from not less than 0.01 to not more than 0.07. In this manner, a flat shaped belt is provided, and thus deformation of the tire tread portion 5 before and after loading can be reduced, which is effective for reduction in the rolling resistance. The "radial difference BD" as used herein is a value of the difference between line segments drawn respectively from the widthwise center and the widthwise end to the rotation axis of the tire.

Further, in an actual tire design, deformed portion associated with deformation of the side portion and a ground contact shape and a ground contact pressure distribution for preventing partial wear should be considered, thus it is vital to set to an appropriate range without flattening the tire completely. After making an extensive review of the appropriate range, it was recognized that the BD/BW ratio was not less than 0.01.

The test results from which the above described recognition was obtained are shown in detail below. The rolling resistance test was performed using radial tires having a size of 195/65 R15 under a variety of BD/BW ratios. It should be noted that the basic structure of the tires was the same, which is, the tires comprise one carcass ply, two slant belt layers, in which cords disposed on one slant belt layer and on another slant belt layer at an angle of 24° with respect to the equatorial plane of the tire intersect each other, and a circumferential reinforced nylon layer thereon.

In this instance, in the rolling resistance test, a test tire is mounted on a prescribed rim and an internal pressure is adjusted to 210 kPa, thereafter the rolling resistance force of the axle is calculated using a drum test machine (velocity: 80 km/h) having a steel plate surface of 1.7 m in diameter. The measurement results are represented by index numbers on the condition that the rolling resistance force of the conventional tire 1 (BD/BW ratio: not less than 0.04 and not more than 0.07) is 100, as shown, for example, by the widthwise cross section in FIG. 4. The smaller the numerical value becomes, the smaller the rolling resistance becomes. As an evaluation, errors are excluded and differences not less than 5% are regarded as a significant difference in light of market supremacy. In particular, when the rolling resistance is not less than 10%, it is regarded as a large effect.

The conventional tire example 1 shown in Table 1 is a tire having the same shape as the tire whose widthwise cross section is shown in FIG. 4. Further, the comparative tire examples 1 to 4 shown in FIG. 1 are the same as the conventional example tire 1 except that the aspect ratio, which is the above described BD/BW ratio, has been changed variously from that of the conventional example tire 1. As shown in FIG. 5 that shows comparison of evaluation results of these tires based on Table 1, the rolling resistances of any of the comparative tire examples 1 to 4 are smaller than that of the conventional example tire 1, and thus the comparative tire examples 1 to 4 have superior rolling resistances. It should be noted that the rolling resistance is the smallest for the comparative tire example 3 having a BD/BW ratio of 0.026, and when the BD/BW ratio is less than 0.026, an increasing rolling resistance can be confirmed. Moreover, the rolling resistance of the comparative tire example 4 having a BD/BW ratio of less than 0.01 is larger than those of comparative tire examples 2 and 3, which exhibits almost the same results as the rolling resistance of the conventional tire example 1. As described above, this is caused by the fact that, if the belt is completely flat, the ground contact pressure will be uneven by the influence of the deformation of the side portions when the tire contacts the ground. Therefore, it is not appropriate to set the BD/BW ratio to less than 0.01.

As described above, for the rolling resistance, a significant difference from the conventional tire 1 was confirmed when the BD/BW ratio is in a range from not less than 0.01 to not more than 0.07. More preferably, it is in a range from not less than 0.01 to not more than 0.04.

Further, when a belt is formed in a flat shape, it inevitably causes the ground contact portion of the tire to be in an almost flat state. Thus as an additional effect, the shear force acting on the ground contact face can be distributed uniformly, thereby improving the wear resistance of the tire. As a physical behavior, wear caused by the radial difference shear force can be significantly reduced.

The feature [2] defines that the ratio of SWh to SH or a SWh/SH ratio is not less than 0.5, which means that the tire has a maximum width at the portion which is closer to the road surface than the middle of the side portion, which is, around the shoulder portion 9. Normally, with this shape, the tire may have a partially flexed region near the shoulder portion 9, and thus the flexural stiffness against the radial load will be small in this region. Thus flex of the tire under load can be concentrated near the shoulder portion 9. Dominant causes for energy loss of the rubber causing the rolling resistance of the tire include flex of the tread portion 5. With respect to this, the stiffness near both sides of the tread portion 5 may be intentionally decreased, and such aggressive flex may mitigate the shear deformation generated at the tread portion 5, causing reduction in an energy loss, and thus the rolling resistance can be decreased. The "sectional height SH of the tire" as used herein is a radial distance from the position where the tire has a maximum diameter to the line segment drawn parallel to the rotation axis of the tire at the bead toe 10.

In this instance, the height SWh where the tire has a maximum width is the height that is more than half the sectional height SH of the tire. This is because, on the side of bead portion 11 that may have a turn-up portion of the carcass 2, an energy loss is caused when it is deformed, thus an effect by aggressive flex is small.

The test results from which the above described recognition was obtained are shown in detail below. The rolling resistance test was performed using radial tires having a size of 195/65 R15 under a variety of SWh/SH ratios. It should be noted that the BD/BW ratio was the same, which was 0.026. Other tire construction conditions and evaluation methods are the same as those for the test of BD/BW ratio.

The comparative tire examples 5 to 8 shown in FIG. 1 are the same as the comparative tire example 3 except that the SWh/SH ratios have been changed variously from that of the comparative tire example 3. FIG. 6 shows evaluation results of these tires based on Table 1. First, when comparing the comparative tire example 3 with the comparative tire example 5, the comparative tire example 5 has a significantly higher rolling resistance. In other words, the rolling resistance can be reduced significantly by setting the SWh/SH ratio to not less than 0.5, for example more than 0.55. Further, it is seen that, as the SWh/SH ratio increases, the rolling resistance decreases, and it was confirmed that this tendency lasted until the SWh/SH ratio was set to at least 0.654.

This is because the position of the tire maximum width was moved close to the ground contact face, then the curvature near the shoulder portion 9 increased, and the flex under load preferentially concentrated on the portion, which mitigated the flex by the load at the tread portion 5, and the rolling resistance could be reduced. From the above described results, for the rolling resistance, a significant difference from the conventional tire was confirmed when the SWh/SH ratio was not less than 0.5.

The feature [3] defines that the curvature of the carcass 2 in the cross section in the tire width direction is the largest on a path from the intersection $I_2$ to the intersection $I_4$, which means that the carcass 2 flexes more significantly at the position which is radially outer side of the measuring position of the maximum width SW of the tire. In other words, the CRh/SWh ratio or a ratio of the height CRh at the portion where the curvature of the carcass 2 is the maximum with respect to the height SWh of the maximum width position of the tire is not less than 1. It should be noted that, the above described "the height CRh at the portion where the curvature of the carcass 2 is the maximum" refers to the shortest distance from the portion where the curvature of the carcass 2 is the maximum to the straight line passing through the bead toe 10 and parallel to the rotation axis of the tire. When the curvature of the carcass 2 forming a skeleton of the tire increases, the flexural stiffness of the tire decreases, and as described above, flex under load may concentrate on that portion. Therefore, the position where the curvature of the carcass 2 is the maximum is positioned close to the road surface, thereby mitigating, as in the case of the effect by the feature [2], the flex caused by the load of the tread portion, and thus the rolling resistance is reduced.

It should be noted that the "curvature of the carcass 2" as used herein refers to the curvature of carcass 2 that can be measured at radially outer side of the line segment connecting the radially outermost ends of both bead cores 1. For example, when the carcass 2 has a turn-up portion 2a turning up and extending at the bead core 1 from the inner side to the outer side in the tire width direction, the "curvature of carcass 2" as used herein does not include the curvature measured at the turn-up portion 2a.

The test results from which the above described recognition was obtained are shown in detail below. In other words, the rolling resistance test was performed using radial tires having a size of 195/65 R15 under a variety of CRh/SWh ratios. It should be noted that the BD/BW ratio and the SWh/SH ratio were the same, which were 0.026 and 0.654, respectively. Other tire construction conditions and evaluation methods are the same as those for the test of BD/BW ratio.

The comparative tire example 9 is the same as the comparative tire example 8 except that the CRWSWh ratio has been changed from that of the comparative tire example 8. When comparing the comparative tire example 9 with the comparative tire example 8 with reference to Table 1, the comparative example tire 9 is superior in the rolling resistance. It should be noted that the rolling resistance can be reduced as the CRh/SWh ratio increases. However, there is a manufacturing limit on the inner face curvature of the carcass, and thus the value of CRh/SWh ratio is limited. In light of such limits, it is preferable that the measuring position of the height CRh is positioned around the middle of the path from $I_4$ to $I_2$. Thus, a preferable numerical value of the CRh/SWh ratio is from 1.15 to 1.25.

This is because an increase in the curvature of the portion near the tread portion 5 of the tire reduces the flexural stiffness at that portion, and thus as in the above described instance, deformation of the tread portion 5 due to load is mitigated. From the above described results, for the rolling resistance, a significant difference from the conventional tire was confirmed when the SWh/SH ratio was not less than 0.5.

Further, in order to provide a maximum tire width near the ground contact face and obtain a belt which is as flat as possible, it is required to increase the curvature between them, that is, a path from $I_2$ to $I_4$. Thus, the features [1] and [2] can coexist easily by satisfying the feature [3], which is, the curvature of the carcass in the cross section in the tire width direction is the maximum on a path from the intersection $I_2$ to the intersection $I_4$.

The lower carcass 2d, which is radially inner side of the intersection $I_1$ of the carcass, becomes in a rising state by satisfying the feature [4], which is, the path length $CSR_1$ of the carcass 2 is longer than the path length $CSR_2$. In this instance, in the cross section in the tire width direction, the angle α between the straight line drawn from the bead fit point 8 to the measuring position of the tire maximum width SW on the periphery of the side portion of the tire and the rotation axis of the tire (hereinafter referred to as a bead back face angle α) increases. The bead fit point 8 refers to the intersection between the straight line drawn from the center of the bead core 1 to the radially outer side and the periphery of the bead portion.

When the lower carcass 2d rises, that is, the bead back face angle α becomes more nearly 90°, the stiffness against the radial load increases at this portion, which makes the portion less likely to be deformed. On the other hand, the portion which is radially outer side of the intersection $I_1$ of the carcass 2 (hereinafter referred to as an upper carcass 2u) has a warped shape, and thus the stiffness against the radial load reduces, which enables concentration of tire deformation near the upper carcass 2u under load.

As described above, a deformation of the tire tread portion 5 is a dominant factor of energy loss causing the rolling resistance is mainly. This is because the tread portion 5 contains materials having different elongation rates such as a circumferential belt layer 4 containing steel, slant belt layer 3 and the like, and the stiffness is high. Therefore, even at the bead portion 11 which normally has a high stiffness because it contains hard rubber and the carcass 2 is turned up, a large energy loss may occur during flexing as described above. In the above described feature [4], the upper carcass 2u is warped to reduce stiffness and the lower carcass 2d is raised to improve the stiffness, thereby preferentially flexing the upper carcass 2u to control flexing of the lower carcass 2d located at the bead portion 11. Thus the energy loss due to rolling of the load of the tire is controlled and the rolling resistance can be reduced.

The test results from which the above described recognition was obtained are shown in detail below. The rolling resistance test was performed using radial tires having a size of 195/65 R15 under a variety of $CSR_1/CSR_2$ ratios. It should be noted that the same BD/BW ratio, SWh/SH ratio and CRh/SWh ratio were used throughout the test, which were 0.026, 0.654 and 1.20 respectively. Other tire construction conditions and evaluation methods were the same as those for the test of BD/BW ratio.

Inventive tire examples 1 to 3 are the same as the comparative tire example 9 except that $CSR_1/CSR_2$ ratio has been changed variously from that of the comparative tire example 9. FIG. 7 shows a comparison of evaluation results of these tires based on Table 1. As can be seen in FIG. 7, the rolling resistance decreases significantly at around 1.0 of $CSR_1/CSR_2$ ratio, that is, from the comparative tire example 9 to the inventive tire example 1. Moreover, when the $CSR_1/CSR_2$ ratio increases further, the rolling resistance can be decreased further. It should be noted that, as the value of $CSR_1/CSR_2$ increases, the rolling resistance decreases. However, there is a manufacturing limit thereon. Thus the optimal value of $CSR_1/CSR_2$ ratio in light of the limit is 1.23.

This is because the flexural stiffness at the tire shoulder portion 9 is decreased so that the portion is preferentially flexed under load, and thus deformation of the bead portion 11 and the tread portion 5 due to load is mitigated. As described above, for the rolling resistance, a significant difference from the conventional tire was confirmed when the $CSR_1/CSR_2$ ratio was not less than 1.0. Further, it was confirmed that as the $CSR_1/CSR_2$ ratio increases, the rolling resistance decreases.

Each of the features [1] to [4] satisfied by the tire according to the present invention was described above. In this instance, for the tire according to the present invention, as shown in FIG. 1, the carcass 2 has a turn-up portion 2a turning up and extending from the inner side to the outside in the tire width direction at the bead core 1, and it is preferable that the shortest distance CSEh between the end of the turn-up portion 2a and the line segment drawn parallel to the rotation axis of the tire at the bead toe is not more than the shortest distance SWh between the line segment drawn parallel to the rotation axis of the tire at the maximum width position of the tire and the line segment drawn parallel to the rotation axis of the tire at the bead toe. More preferably, it is not more than 0.5 times the shortest distance SWh.

When the tire has the turn-up portion 2a of the carcass, the bead portion 11 has a doubly arranged carcass 2, thus the energy loss due to flexing increases. The energy loss at the bead portion 11 is one of the causes for the rolling resistance. Thus, it is possible to expand the flexing range in which the energy loss is unlikely to be generated at the tire side portions by shortening the turn-up portion 2a. Moreover, it is further preferable that the height CSEh of the turn-up end portion is less than half the length of SWh. In other words, normally, the portion near the middle of SWh significantly flexes under load of the tire. However, energy loss due to flexing at the portion can be reduced by setting CSEh to not more than SWh/2, thus it is effective.

The test results from which the above described recognition was obtained are shown in detail below. The rolling resistance test was performed using radial tires having a size of 195/65 R15 under a variety of CSEh/SWh ratios. It should be noted that the same BD/BW ratio, SWh/SH ratio, CRh/SWh ratio and $CSR_1/CSR_2$ ratio were used throughout the test, which were 0.026, 0.654, 1.20 and 1.23 respectively. Other tire construction conditions and evaluation methods were the same as those for the test of BD/BW ratio.

Inventive tire examples 4 to 8 are the same as the inventive tire example 3 except that CSEh/SWh ratio has been changed variously from that of the inventive tire example 3. FIG. 8 shows a comparison of the evaluation results of the inventive tire examples 4 to 8 based on Table 1. As can be seen in FIG. 8, as the CSEh/SWh ratio decreases from 1.0, the rolling resistance gradually decreases. Further, a significant decrease in the rolling resistance can be seen when the CSEh/SWh ratio exceeds 0.5.

This is because the flexing range in which an energy loss is unlikely to be generated could be expanded at the tire side portions by shortening the turn-up portion 2a, which can be a cause for energy loss during flexing. A remarkable effect could be seen when the CSEh/SWh ratio dropped to 0.5 or less. This is because, in the conventional tires, a particularly large flexing was caused at the middle portion of the height SWh at the maximum width position of the tire under load. To this, it is considered that an energy loss at the tire side portions could be reduced, and thus the rolling resistance could be reduced by shortening the turn-up portion 2a of the carcass so as not to reach the middle portion.

From the above described results, in the present invention, the CSEh/SWh ratio is preferably not more than 1.0, and more preferably not more than 0.5.

Further, in the present invention, the curvature radius R at the portion where the curvature of the carcass 2 is the maximum is preferably not more than 25 mm. This is because, the portion where the curvature of the carcass 2 is the maximum, that is, the curvature of the carcass 2 near the tread portion 5 is increased, thereby decreasing the flexural stiffness at the tire side portion of the portion, and thus the flexing of the tread portion 5 can be mitigated.

The test results from which the above described recognition was obtained are shown in detail below. The rolling resistance test was performed using radial tires having a size of 195/65 R15 under a variety of the above described curvature radius R. It should be noted that the same BD/BW ratio, SWh/SH ratio, CRh/SWh ratio, $CSR_1/CSR_2$ ratio and CSEh/SWh ratio were used throughout the test, which were 0.026, 0.654, 1.20, 1.23 and 0.25 respectively. Other tire construction conditions and evaluation methods were the same as those for the test of BD/BW ratio.

Inventive tire examples 9 to 12 are the same as the inventive tire example 8 except that curvature radius R at the portion where the curvature of the carcass 2 is the maximum has been variously changed from that of the inventive tire example 8. FIG. 9 shows a comparison of the evaluation results of these tires based on Table 1. As can be seen in FIG. 9, as the curvature radius decreases from 40, the rolling resistance gradually decreases. In particular, a significant improvement effect is seen when the curvature radius is not more than 30 mm, and further not more than 25 mm.

In other words, in the above described performance evaluation test, it can be said that the rolling resistance was decreased by increasing the curvature of the carcass 2 near the tread portion 5 of the tire. It is obvious from the example shown in the drawing that if the curvature increases, a decrease effect of the rolling resistance increases further. However, due to manufacturing problems, the curvature radius R could not be reduced to less than 20 mm. Thus, an appropriate range of the curvature radius R considering also manufacturing is not more than 25 mm. From the results mentioned above, in the present invention, the curvature radius R is preferably not more than 25 mm.

EXAMPLE

Radial tires having a size of 195/65 R15 were prepared according to the specifications shown in FIG. 1 and a rolling resistance test was performed. It should be noted that the basic structure of the tires is the same, which is, the tires comprise one carcass ply, two slant belt layers, in which cords disposed on one slant belt layer and on another slant belt layer at an angle of 24° with respect to the equatorial plane of the tire intersect each other and a circumferential reinforced nylon layer thereon.

FIG. 1 shows the evaluation results thereof. It was confirmed that the inventive example according to the present invention has a significant difference from the conventional example with respect to the rolling resistance.

TABLE 1

| | Evaluation results | | | | | | | | | | | |
|---|---|---|---|---|---|---|---|---|---|---|---|---|
| | Outer surface dimension | | | Construction dimension | | BD/ BW | SWh/ SH | CRh/ SWh | CSR1/ CSR2 | CSEh/SWh | Curvature Radius R | Rolling resistance |
| | SW | SWh | SH | CSW | CSH | | | | | | | |
| Conventional tire 1 | 200 | 61 | 127 | 192 | 114 | 0.07 | 0.48 | 0.97 | 0.95 | 0.90 | 40 | 100 |
| Comparative tire 1 | 200 | 61 | 127 | 192 | 114 | 0.06 | 0.48 | 0.97 | 0.95 | 0.90 | 30 | 97 |
| Comparative tire 2 | 200 | 61 | 127 | 192 | 114 | 0.04 | 0.48 | 0.97 | 0.95 | 0.90 | 30 | 95 |

TABLE 1-continued

Evaluation results

|  | Outer surface dimension | | | Construction dimension | | BD/BW | SWh/SH | CRh/SWh | CSR1/CSR2 | CSEh/SWh | Curvature Radius R | Rolling resistance |
|---|---|---|---|---|---|---|---|---|---|---|---|---|
|  | SW | SWh | SH | CSW | CSH | | | | | | | |
| Comparative tire 3 | 200 | 61 | 127 | 192 | 114 | 0.026 | 0.48 | 0.97 | 0.95 | 0.90 | 30 | 94 |
| Comparative tire 4 | 200 | 61 | 127 | 192 | 114 | 0.007 | 0.48 | 0.97 | 0.95 | 0.90 | 30 | 96 |
| Comparative tire 5 | 200 | 66 | 127 | 192 | 114 | 0.026 | 0.52 | 0.97 | 0.95 | 0.90 | 30 | 93 |
| Comparative tire 6 | 200 | 72 | 127 | 192 | 114 | 0.026 | 0.567 | 0.97 | 0.95 | 0.90 | 30 | 92 |
| Comparative tire 7 | 200 | 77 | 127 | 192 | 114 | 0.026 | 0.606 | 0.97 | 0.95 | 0.90 | 30 | 92 |
| Comparative tire 8 | 200 | 83 | 127 | 192 | 114 | 0.026 | 0.654 | 0.97 | 0.95 | 0.90 | 30 | 91 |
| Comparative tire 9 | 200 | 83 | 127 | 192 | 114 | 0.026 | 0.654 | 1.20 | 0.95 | 0.90 | 30 | 90 |
| Inventive tire 1 | 200 | 83 | 127 | 192 | 114 | 0.026 | 0.654 | 1.20 | 1.01 | 0.90 | 30 | 88 |
| Inventive tire 2 | 200 | 83 | 127 | 192 | 114 | 0.026 | 0.654 | 1.20 | 1.12 | 0.90 | 30 | 87 |
| Inventive tire 3 | 200 | 83 | 127 | 192 | 114 | 0.026 | 0.654 | 1.20 | 1.23 | 0.90 | 30 | 86 |
| Inventive tire 4 | 200 | 83 | 127 | 192 | 114 | 0.026 | 0.654 | 1.20 | 1.23 | 1.00 | 30 | 85 |
| Inventive tire 5 | 200 | 83 | 127 | 192 | 114 | 0.026 | 0.654 | 1.20 | 1.23 | 0.60 | 30 | 82 |
| Inventive tire 6 | 200 | 83 | 127 | 192 | 114 | 0.026 | 0.654 | 1.20 | 1.23 | 0.50 | 30 | 78 |
| Inventive tire 7 | 200 | 83 | 127 | 192 | 114 | 0.026 | 0.654 | 1.20 | 1.23 | 0.40 | 30 | 75 |
| Inventive tire 8 | 200 | 83 | 127 | 192 | 114 | 0.026 | 0.654 | 1.20 | 1.23 | 0.25 | 30 | 73 |
| Inventive tire 9 | 200 | 83 | 127 | 192 | 114 | 0.026 | 0.654 | 1.20 | 1.23 | 0.25 | 40 | 77 |
| Inventive tire 10 | 200 | 83 | 127 | 192 | 114 | 0.026 | 0.654 | 1.20 | 1.23 | 0.25 | 30 | 75 |
| Inventive tire 11 | 200 | 83 | 127 | 192 | 114 | 0.026 | 0.654 | 1.20 | 1.23 | 0.25 | 25 | 70 |
| Inventive tire 12 | 200 | 83 | 127 | 192 | 114 | 0.026 | 0.654 | 1.20 | 1.23 | 0.25 | 20 | 65 |

INDUSTRIAL APPLICABILITY

The tire according to the present invention can be widely used in the automobile industry, thereby significantly reducing the burden of automobiles on the environment. Further, considering a considerable impact of the automobile industry on the current global environmental issues, the present invention may significantly contribute to solve the environmental issues.

REFERENCE NUMERALS

| | |
|---|---|
| SW | Maximum width of the tire |
| CSW | Maximum width of the carcass |
| BW | Belt width |
| BD | Radial difference between the end and center in the tire width direction of the belt |
| SH | Sectional height of the tire |
| CSH | Height of the carcass |
| R | Curvature radius of the portion where the curvature of the carcass is the maximum |
| CRh | Height of the portion where the curvature of the carcass is the maximum |
| CSEh | Height of the end of the turn-up portion |
| SWh | Height of the maximum width measuring position of the tire |
| $I_1$ | Intersection 1 (CSH/2) |
| $I_2$ | Intersection 2 (under the belt end) |
| $I_3$ | Intersection 3 (above the bead core) |
| $I_4$ | Intersection 4 (height of the maximum width measuring point of the tire) |
| $CSR_1$ | Path length of the upper carcass |
| $CSR_2$ | Path length of the lower carcass |
| 0 | Equatorial plane of the tire |
| 1 | Bead core |
| 2 | Carcass |
| 2s | Carcass at the shoulder portion |
| 2u | Upper carcass |
| 2d | Lower carcass |
| 2a | Turn-up portion |
| 3 | Slant belt layer |
| 3a | Slant belt layer (the narrowest width) |
| 3b | Slant belt layer |
| 4 | Circumferential belt layer |
| 5 | Tread portion |
| 6 | Pneumatic tire |
| 7 | Prescribed rim |
| 8 | Bead fit point |
| 9 | Shoulder portion |
| 10 | Bead toe |
| 11 | Bead portion |
| α | Bead back face angle |

The invention claimed is:

1. A pneumatic tire comprising a pair of bead portions, a carcass as a skeleton extending in a toroidal shape across the pair of bead portions, a belt including at least one slant belt layer, and a tread, the belt and the tread being sequentially disposed on a radially outer side of a crown portion of the carcass, wherein
as seen in a cross section in the tire width direction when the tire is mounted on a prescribed rim,
a BD/BW ratio is from 0.01 to 0.07, where BD is the radial difference between the widthwise center and the widthwise end of the narrowest slant belt layer constituting the belt, and BW is the width of the narrowest slant belt layer;
an SWh/SH ratio is not less than 0.5, where SWh is the shortest distance between a line segment parallel to a rotation axis of the tire at the maximum width position of the tire and a line segment parallel to the rotation axis of the tire at a bead toe, and SH is a sectional height of the tire;
a curvature of the carcass in the cross section in the tire width direction is the maximum on a path from an intersection ($I_2$) between a line segment perpendicular to the rotation axis of the tire from a widthwise end of the narrowest slant belt layer and the carcass, to an intersection ($I_4$) between a line segment parallel to the rotation axis of the tire at the maximum width position of the tire and the carcass;
a path length $CSR_1$ of the carcass from an intersection ($I_1$) between a line bisecting a radial distance CSH between the radially outermost end of the carcass and the radially outermost end of a bead core and extending parallel to the rotation axis of the tire, to the intersection ($I_2$), is longer than a path length $CSR_2$ of the carcass from the intersection ($I_1$) to an intersection ($I_3$) between a line connecting the radially outermost ends of both bead cores; and a CRh/SWh ratio is from 1.15 to 1.25, where CRh is the shortest distance from the portion where the curvature of the carcass is the maximum to the straight line passing through the bead toe and parallel to the rotation axis of the tire, and SWh is the shortest distance between a line segment parallel to a rotation axis of the tire at the maximum width position of the tire and a line segment parallel to the rotation axis of the tire at a bead toe.

2. A pneumatic tire comprising a pair of bead portions, a carcass as a skeleton extending in a toroidal shape across the pair of bead portions, a belt including at least one slant belt layer, and a tread, the belt and the tread being sequentially disposed on a radially outer side of a crown portion of the carcass, wherein as seen in a cross section in the tire width direction when the tire is mounted on a prescribed rim, a BD/BW ratio is from 0.01 to 0.07, where BD is the radial difference between the widthwise center and the widthwise end of the narrowest slant belt layer constituting the belt, and BW is the width of the narrowest slant belt layer;

an SWh/SH ratio is not less than 0.5, where SWh is the shortest distance between a line segment parallel to a rotation axis of the tire at the maximum width position of the tire and a line segment parallel to the rotation axis of the tire at a bead toe, and SH is a sectional height of the tire;

a curvature of the carcass in the cross section in the tire width direction is the maximum on a path from an intersection ($I_2$) between a line segment perpendicular to the rotation axis of the tire from a widthwise end of the narrowest slant belt layer and the carcass, to an intersection ($I_4$) between a line segment parallel to the rotation axis of the tire at the maximum width position of the tire and the carcass;

a path length $CSR_1$ of the carcass from an intersection ($I_1$) between a line bisecting a radial distance CSH between the radially outermost end of the carcass and the radially outermost end of a bead core and extending parallel to the rotation axis of the tire, to the intersection ($I_2$), is longer than a path length $CSR_2$ of the carcass from the intersection ($I_1$) to an intersection ($I_3$ between a line connecting the radially outermost ends of both bead cores;

the carcass has a turn-up portion turning up around the bead core from the widthwise inner side to the outer side and extending therefrom, and the shortest distance CSEh between the end of the turn-up portion and the line segment parallel to the rotation axis of tire at the bead toe is not more than the shortest distance SWh between the line segment parallel to the rotation axis of tire at the maximum width position of the tire and the line segment parallel to the rotation axis of the tire at the bead toe; and a CRh/SWh ratio is from 1.15 to 1.25, where CRh is the shortest distance from the portion where the curvature of the carcass is the maximum to the straight line passing through the bead toe and parallel to the rotation axis of the tire, and SWh is the shortest distance between a line segment parallel to a rotation axis of the tire at the maximum width position of the tire and a line segment parallel to the rotation axis of the tire at a bead toe.

3. A pneumatic tire comprising a pair of bead portions, a carcass as a skeleton extending in a toroidal shape across the pair of bead portions, a belt including at least one slant belt layer, and a tread, the belt and the tread being sequentially disposed on a radially outer side of a crown portion of the carcass, wherein as seen in a cross section in the tire width direction when the tire is mounted on a prescribed rim, a BD/BW ratio is from 0.01 to 0.07, where BD is the radial difference between the widthwise center and the widthwise end of the narrowest slant belt layer constituting the belt, and BW is the width of the narrowest slant belt layer;

an SWh/SH ratio is not less than 0.5, where SWh is the shortest distance between a line segment parallel to a rotation axis of the tire at the maximum width position of the tire and a line segment parallel to the rotation axis of the tire at a bead toe, and SH is a sectional height of the tire;

a curvature of the carcass in the cross section in the tire width direction is the maximum on a path from an intersection ($I_2$) between a line segment perpendicular to the rotation axis of the tire from a widthwise end of the narrowest slant belt layer and the carcass, to an intersection ($I_4$) between a line segment parallel to the rotation axis of the tire at the maximum width position of the tire and the carcass;

a path length $CSR_1$ of the carcass from an intersection ($I_1$) between a line bisecting a radial distance CSH between the radially outermost end of the carcass and the radially outermost end of a bead core and extending parallel to the rotation axis of the tire, to the intersection ($I_2$), is longer than a path length $CSR_2$ of the carcass from the intersection ($I_1$) to an intersection ($I_3$) between a line connecting the radially outermost ends of both bead cores;

the carcass has a turn-up portion turning up around the bead core from the widthwise inner side to the outer side and extending therefrom, and the shortest distance CSEh between the end of the turn-up portion and the line segment parallel to the rotation axis of tire at the bead toe is not more than the shortest distance SWh between the line segment parallel to the rotation axis of tire at the maximum width position of the tire and the line segment parallel to the rotation axis of the tire at the bead toe;

the shortest distance, CSEh, between the end of the turn-up portion and the line segment parallel to the rotation axis of the tire at the bead toe is not more than 0.5 times the shortest distance, SWh, between the line segment parallel to the rotation axis of the tire at the maximum width position of the tire and the line segment parallel to the rotation axis of the tire at the bead toe; and a CRh/SWh ratio is from 1.15 to 1.25, where CRh is the shortest distance from the portion where the curvature of the carcass is the maximum to the straight line passing through the bead toe and parallel to the rotation axis of the tire, and SWh is the shortest distance between a line segment parallel to a rotation axis of the tire at the maximum width position of the tire and a line segment parallel to the rotation axis of the tire at a bead toe.

* * * * *